Feb. 24, 1948. G. EVERLINE 2,436,715
ANTISKID TIRE CHAIN
Filed March 8, 1945
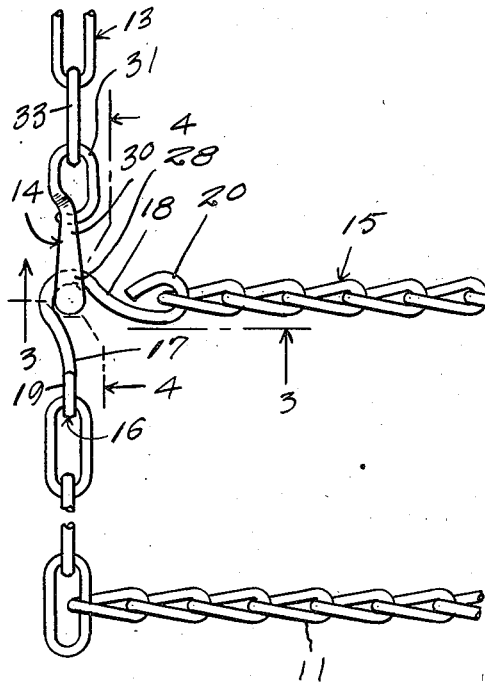
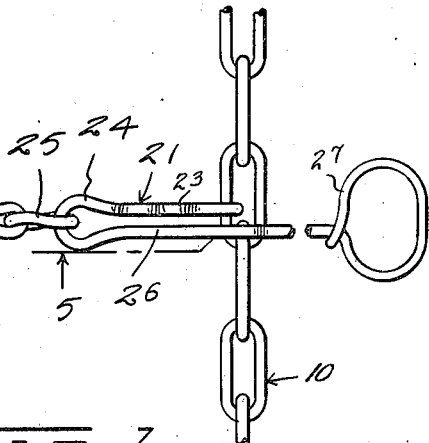
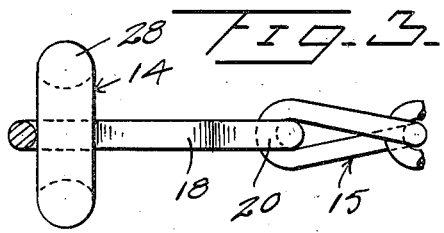
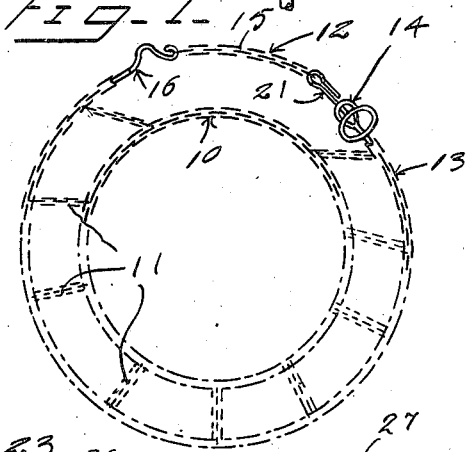
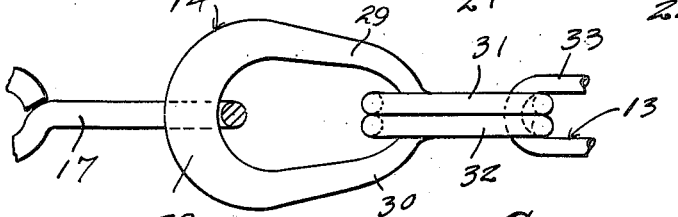
Inventor
George Everline
By Kimmel & Crowell
Attorneys Patented Feb. 24, 1948

2,436,715

UNITED STATES PATENT OFFICE 2,436,715

ANTISKID TIRE CHAIN

George Everline, Hagerstown, Md.

Application March 8, 1945, Serial No. 581,574

1 Claim. (Cl. 152—242)

This invention relates to anti-skid tire chains.

An object of this invention is to provide an anti-skid chain which embodies two circular side chains and connecting cross or tread chains, one of the side chains being contractable from a diameter larger than the other side chain to a diameter equal to the diameter of the other side chain, the contracting portion of the large diameter side chain forming one of the cross chains.

Another object of this invention is to provide an anti-skid chain which can be easily and quickly applied or removed, without making it necessary to lie on the ground under the car in order to have access to the inner side chain with both hands to clamp the ends together, as in other types of chains.

A further object of this invention is to provide in an anti-skid chain of this kind an improved latching means for latching the adjustable cross chain, the latching means being slidable through a loop or eye carried by the large side chain and including a loop constituting a handle whereby the adjustable cross chain will be held against separation from the eye.

To the foregoing objects and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detail side elevation, partly diagrammatic, of an anti-skid chain constructed according to an embodiment of this invention, showing the chain in expanded position.

Figure 2 is a fragmentary plan view of the chain in applied position.

Figure 3 is a fragmentary sectional view taken on the line 3—3 of Figure 2.

Figure 4 is a fragmentary sectional view taken on the line 4—4 of Figure 2.

Figure 5 is a fragmentary sectional view taken on the line 5—5 of Figure 2.

Referring to the drawing, the numeral 10 designates generally a circular side chain, which is preferably the outer side chain, being formed of connected links with no opening, and the chain 10 has secured thereto a plurality of cross chains 11.

An inner side chain generally designated as 12 is connected to the opposite ends of the cross chains 11, and the inner side chain 12 in its expanded position is of greater diameter than the outer side chain 10 so that the inner side chain 12 may be readily passed over the tread of the tire for positioning on the inner side thereof.

In order to provide a means whereby the inner side chain may be contracted so as to tighten the cross chains 11 over the tread of the tire, the inner chain 12 is formed of an elongated chain 13 which is substantially greater than a semicircle, and the chain 13 at one end thereof has secured thereto an eye or loop 14. The eye or loop 14 is of sufficient size that the cross chain section 15 may readily slip therethrough. The cross chain section 15 completes the large diameter circle formed by the chain 13 and the chain 15, and is secured at one end to a connector generally designated as 16.

The connector 16 is formed of a bent bar having arms 17 and 18 which are disposed on an obtuse angle relative to each other, and arm 17 is formed with an eye 19, engaging the adjacent end of chain 13. Arm 18 is formed with an eye 20 with which one end of the combined cross and side chain section 15 is connected.

The combined cross and side chain 15 has secured to the opposite end thereof a latching hook, generally designated as 21. The latching hook 21 comprises a bill 22 formed integral with a corrugated shank 23, and the free end of bill 22 is bent inwardly toward shank 23. The shank 23 is corrugated so that side chain 15 may be expanded to its maximum and hook 21 may freely slip through loop 14 without bill 22 catching thereon. The shank 23 is formed with a loop 24, engaging through the end link 25 of the combined cross and side chain 15, and the loop 24 includes an elongated bar 26 extending parallel with the shank 23. The bar 26 has a looped handle 27 formed integral therewith which extends beyond the closed end of bill 22, so that when bill 22 is engaged with a link of side chain 10, the looped handle 27 will project a short distance beyond the side chain.

The loop or eye 14 is formed from an elongated bar, having a relatively thick portion 28 and reduced diameter converging sides 29 and 30 extending from the thick or closed end portion 28. The converging sides 29 and 30 are formed with reverted link forming hooks 31 and 32, respectively, which are adapted to engage the adjacent end link 33 of chain section 13. The loop or eye 14 is of sufficient size that the latching hook 21 may readily pass therethrough, but the looped handle 27 is sufficiently large in diameter or size so that when the latching means 21 is released from outer side chain 10, the eye or handle 27 will limit the expansion of the inner side chain and hold the ends of the inner side chain together.

In the application of this anti-skid chain the inner side chain is expanded and extended over the tire at an angle. The wheel may then be rolled in either direction for either a complete turn of the wheel, or a partial turn, so that that portion of side chain 15 which was at the bottom may be extended over the tire. The handle or loop 27 is then pulled so as to draw chain section 15 through the loop or eye 14 and across the tread of the tire. The chain 15 is pulled until the connector 16 is in engagement with eye 14, as shown in Figure 2.

Connector 16 by reason of its substantially right angular construction will lock into loop or eye 14, and chain section 15 at this time is extended transversely over the tread of the tire. Bill 22 of the latching means is then engaged with an adjacent link of the outer side chain, hooking over one side of the link and resiliently locking the latching means to the outer side chain 10. The pulling of the chain 15 through the eye 14 will tightly bind all of the cross chains over the tread of the tire and will at the same time tighten the outer side chain 10 against the outer face or side of the tire. Connector 16 is so constructed that it cannot slip through loop 14 and allow side chain 15 to become loosened or expanded as long as hook 21 is engaged with a link of side chain 10.

With an anti-skid chain as hereinbefore described the chain ends are eliminated so that these ends cannot become tangled when the chain is not in use.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claim.

What is claimed is:

An anti-skid chain comprising a pair of side chains and a plurality of cross chains, one of said side chains being of complete circular formation and the other side chain being split and in unapplied position forming a circle greater than the circle of said one side chain, said other side chain including a loop at one end through which the other end thereof is freely slidable, said other side chain also including a right angle link inwardly from the other end thereof adapted when the chain is in applied position to project partly through said loop whereby a short portion of said other chain may be extended as a cross chain over the tire tread, a latching hook carried by said other end of said other chain, an elongated shank integral with and extending parallel with the back of said hook, said shank terminating in a large loop beyond said hook, said latter loop being larger than said first loop whereby the ends of said other chain will be held against separation when the device is unapplied, said hook being releasably engageable with a link of said one side chain.

GEORGE EVERLINE.

REFERENCES CITED

The following references are of record in the file of this patent:

UNITED STATES PATENTS

| Number | Name | Date |
| --- | --- | --- |
| 411,857 | F. E. DeLong | Oct. 1, 1889 |
| 502,529 | H. S. Piggins | Aug. 1, 1893 |
| 533,385 | A. Tweedale | Jan. 29, 1895 |
| 1,672,019 | Barber | June 5, 1928 |
| 2,059,100 | Green | Oct. 27, 1936 |